United States Patent
Wootton et al.

(10) Patent No.: US 9,527,158 B2
(45) Date of Patent: Dec. 27, 2016

(54) SYSTEMS AND METHODS FOR PRODUCING SILICON SLIM RODS

(75) Inventors: Gerald Wootton, Cambridge (CA); Steven Van Loon, Cambridge (CA)

(73) Assignee: ATS AUTOMATION TOOLING SYSTEMS INC., Cambridge, Ontario (CA)

( * ) Notice: Subject to any disclaimer, the term of this patent is extended or adjusted under 35 U.S.C. 154(b) by 659 days.

(21) Appl. No.: 13/561,623

(22) Filed: Jul. 30, 2012
(Under 37 CFR 1.47)

(65) Prior Publication Data

US 2013/0174607 A1    Jul. 11, 2013

Related U.S. Application Data

(60) Provisional application No. 61/513,237, filed on Jul. 29, 2011.

(51) Int. Cl.
*B23K 26/00*    (2014.01)
*B24C 1/04*    (2006.01)
(Continued)

(52) U.S. Cl.
CPC ....... *B23K 26/0042* (2013.01); *B23K 26/0006* (2013.01); *B23K 26/402* (2013.01);
(Continued)

(58) Field of Classification Search
CPC combination set(s) only.
See application file for complete search history.

(56) References Cited

U.S. PATENT DOCUMENTS

| 4,761,535 A * | 8/1988 | Lawson | H02G 1/128 219/121.68 |
| 4,908,493 A * | 3/1990 | Susemihl | 219/121.67 |

(Continued)

FOREIGN PATENT DOCUMENTS

| CN | 1779914 | 5/2006 |
| CN | 201881054 | 6/2011 |

OTHER PUBLICATIONS

GSI JK Lasers, "Laser Cutting of Silicon Wafers", Corporate Brochure, Aug. 15, 2010, Rugby, UK.
(Continued)

*Primary Examiner* — Dana Ross
*Assistant Examiner* — Renee Larose
(74) *Attorney, Agent, or Firm* — Gowling WLG (Canada) LLP; Neil Henderson

(57) ABSTRACT

A method and system for preparing polysilicon slim rods, the method and system including: placing a piece of polysilicon on a fixture; applying a predetermined laser beam or abrasive jet to the piece of polysilicon; and separating a polysilicon slim rod from the piece of polysilicon. The laser beam may be used for either cutting or for cracking depending on the operating parameters chosen. There may also be various combinations of cutting and cracking used in order to separate the slim rod from the piece of polysilicon. For example, the laser cut may be a scribing and/or partial cut and the separation may be completed by cracking the remaining silicon. In this case, the cracking may be accomplished by, for example, mechanical bending or laser cracking. Generally speaking, a laser beam used for cracking may be different from and have differing operating parameters from a laser beam used for cutting.

11 Claims, 11 Drawing Sheets

(51) Int. Cl.
    *B26F 3/16*     (2006.01)
    *C01B 33/035*     (2006.01)
    *B23K 26/40*     (2014.01)

(52) U.S. Cl.
    CPC ............... *B24C 1/045* (2013.01); *B26F 3/16* (2013.01); *C01B 33/035* (2013.01); *B23K 2203/42* (2015.10); *B23K 2203/56* (2015.10); *Y10T 225/10* (2015.04); *Y10T 225/304* (2015.04)

(56) References Cited

U.S. PATENT DOCUMENTS

| | | | | |
|---|---|---|---|---|
| 5,521,352 A * | 5/1996 | Lawson | ............... | B23K 26/067 219/121.67 |
| 6,350,313 B2 | 2/2002 | Kraus et al. | | |
| 6,780,692 B2 * | 8/2004 | Tatsuki | ............. | H01L 29/66765 257/E21.414 |
| 7,157,038 B2 * | 1/2007 | Baird | ................... | B23K 26/083 219/121.69 |
| 2004/0055634 A1 * | 3/2004 | Yamaguchi | .................... | 136/252 |
| 2008/0061043 A1 * | 3/2008 | Fujii | .................. | B23K 26/0604 219/121.69 |
| 2008/0305615 A1 * | 12/2008 | Ueno et al. | .................... | 438/463 |
| 2009/0269493 A1 | 10/2009 | Mizuno et al. | | |
| 2010/0077897 A1 | 4/2010 | Gurley et al. | | |
| 2010/0117199 A1 * | 5/2010 | Eisele | ........................... | 257/618 |

OTHER PUBLICATIONS

Leone et al., "Laser Cutting of Silicon Wafer by Pulsed Nd; YAG source", IProms—6th Virtual International Conference on Innovative Production Machines and Systems, Jul. 26, 2010.

Perrottet et al., "Heat damage-free Laser—Microjet cutting achieves highest die fracture strength", Proceedings of SPIE, Apr. 2005, vol. 5713, pp. 285-292.

International Searching Authority (CA), International Search Report and Written Opinion for International Patent App. No. PCT/CA2012/050517, Nov. 1, 2012.

State Intellectual Property Office of China, Office Action for Chinese Patent Application No. 201280043217.X, dated Nov. 20, 2015.

* cited by examiner

SYSTEMS AND METHODS FOR PRODUCING SILICON SLIM RODS

CROSS REFERENCE TO RELATED APPLICATIONS

This application claims the benefit of priority of U.S. Provisional Patent Application No. 61/513,237 filed Jul. 29, 2011, which is incorporated herein by reference.

FIELD

The present disclosure relates generally to systems and methods for cutting silicon. More particularly, the present disclosure relates to systems and methods for producing and processing silicon slim rods.

BACKGROUND

One process of producing polysilicon material for use in various industries involves "growing" polysilicon onto a base of high purity polysilicon. For example, the Siemens process or similar chemical vapor deposition (CVD) processes are used to produce approximately 80% of the high purity polysilicon produced today. In the Siemens process, polysilicon cylinders (sometimes called boules) are produced by the pyrolytic decomposition of gaseous silicon compound onto a silicon substrate (sometimes referred to as a slim rod). In these processes, polysilicon material is grown in a chemical reactor by means of chemical deposition onto a core material of polysilicon at an elevated temperature. Typically, the core material is initially formed into a U-shaped filament, sometimes called a hairpin, which is enclosed by a pressure vessel and is heated, at least in part, by passing current through it. Gas is fed into the pressure vessel and additional material is deposited onto the filament by Chemical Vapor Deposition (CVD) until it grows substantially in cross-section and surface area eventually forming an approximately cylindrical cross-section of the desired diameter and is removed. The resulting built up filament is cut into cylindrical sections (referred to as a boule). The resulting material is intended to be ultra-pure silicon that is used as feedstock for subsequent processes including the production of semiconductor and photovoltaic wafers. Hairpins are typically produced by joining long thin strips of polysilicon, known as slim rods, and a cross-link. Slim rods may be produced in several alternative ways.

There are modified processes for producing polysilicon that do not require a hairpin electrode, which instead of a 'bell jar' like chamber use a tubular chamber and linear filaments. These approaches still require the production of slim rods. Further alternatives avoid the need for slim rods altogether but none so far have proven to be as effective as the Siemens process or similar processes.

Slim rods may be produced in several alternative ways. In some cases, slim rods are produced by recycling some of the reactor output. Boules are cut into slabs and subsequently cut into thin strips (the slim rods) which are joined together to form new filaments. Conventionally, saw cutting is used to manufacture silicon slim rods. However, this method typically produces a large kerf resulting in reduced material utilization. Saw cutting also tends to have a low feed-rate resulting in low throughput and the need for a considerable amount of equipment to support a large-scale plant. Saw cutting is also a contact method with the inherent possibility of contamination by abrasives and other materials, which is a potential liability in production of high purity material. Saw cutting is also prone to cause breakage, which leads to reduced process yield. Slim rods are typically 6 to 12 millimeters on a side while saw kerfs are typically 1.2 to 1.5 mm. While the kerf material can be recycled, this still represents a substantial loss of valuable material. In some cases, saw cut kerf loss is approximately 18% (1.2 mm kerf versus a 6.5 mm wide slim rod). Typically, chemical etching or other processes also need to be used to clean the slim rods after saw cutting. Approximately 1 out of 48 boules produced are cut into slim rods for re-use in the growth system.

Two parameters, which are somewhat opposing, are the need to make hairpins as long as possible and as thin as possible in order to maximize both material utilization and reactor chamber utilization. As rods become longer and thinner, it becomes more difficult to cut them without breakage and, of course, kerf loss is accentuated (that is, becomes a larger fraction of the polysilicon consumed).

In an alternative, diamond wire saws may be used. Diamond wire sawing can reduce the kerf loss to under 0.2 mm but has other limitations. For example, diamond wire sawing is typically a slow process: wire speed and material removal rates are limited as is cutting force and thermal management of the wire is also critical. A typical cutting speed is in the order of mm/min, consequently cutting the length of a slab, typically up to 2.3 m in length, can be quite time consuming. Additionally, wire cutting without a coolant typically proceeds more slowly creating a tradeoff between use of coolant and reduced feed rate, neither of which is desirable.

In an alternative process, slim rods may alternatively be produced by pulling silicon from a crucible; however, this is a slow and energy intensive process. Also, the resulting rod profile, which is commonly cylindrical, makes assembly of slim rods into a hairpin filament, for example by butt welding, more difficult.

It should also be remembered that tool wear is a problem with cutting tools (disk, wire, grit, etc) as cutting tools typically include items requiring frequent replacement.

In general, the cost of production of slim rods is a significant cost factor in the production of high purity polysilicon. There is a need to provide an improved system and method for production of slim rods that may provide at least one of the following: increased equipment capacity, reduced floor space, reduced energy use, reduced scrap and consumables, among other things, in order to reduce cost of manufacture.

In examining an improvement, material utilization is a useful parameter: the greater the number of slim rods that can be produced from a single boule, the fewer the number of boules that are required to sustain the process, consequently a greater amount of polysilicon is output for a given reactor capacity. As noted above, factors that affect material utilization are kerf loss and breakage and slim rod dimensions.

SUMMARY

It is therefore desirable to mitigate at least one disadvantage of previous systems and methods for producing and manufacturing silicon slim rods.

According to an aspect herein, there is provided a method for preparing polysilicon slim rods, the method including: placing a piece of polysilicon on a fixture; applying a predetermined laser beam to the piece of polysilicon; and separating a polysilicon slim rod from the piece of polysilicon.

In a particular case, the predetermined laser beam may include a plurality of laser beams. As an example, with a plurality of laser beams, a plurality of slim rods may be prepared at the same time.

It will be understood that, as described below, the laser beam may be used for cutting or for cracking depending on the operating parameters chosen.

In a further particular case, the predetermined laser beam may be configured to cut the piece of polysilicon.

In yet a further particular case, the predetermined laser beam is configured to crack the piece of polysilicon.

It will be understood that there may be various combinations of cutting and cracking used in order to separate the slim rod from the piece of polysilicon. For example, the laser cut may be a partial cut and the separation is completed by cracking the remaining silicon. In this case, the cracking may be accomplished by, for example, mechanical bending or laser cracking. In this case, the laser beam used for cracking may be different from and have differing operating parameters from the laser beam used for cutting.

In the cases of cutting or cracking, it will be understood that the predetermined laser beam will be selected based on various factors including, for example, the thickness of the piece of silicon, particularly along the cut line, the depth of the cut or depth of penetration needed to crack the silicon, the desired process feed rate, the laser power or the like as described herein.

In some cases, the process feed rate and/or laser power may be controlled by measuring the crack tip position relative to the laser spot or by measuring the stress in the silicon by optical sensing.

In another particular case, the method may include applying a cover gas during the application of the predetermined laser beam and/or applying an assist gas during the application of the predetermined laser beam.

In yet another particular case, the method may include applying compression to the piece of polysilicon. In particular, the amount of compression is intended to be precisely controlled and variable to allow for adjustment in the process. In some cases, the pressure may be applied approximately uniformly along the length of the cut or crack line. In one particular case, cracking may be accomplished by removing compression immediately following laser cutting.

In still yet another particular case, the method may include texturizing at least a portion of a surface of the piece of polysilicon prior to applying the predetermined laser beam. The texturizing may be applied in various ways, for example, by using a laser or by leaving cut marks on the silicon from previous processing. In some cases, the texturization may be on the whole surface of the silicon while in others the texturization may be selectively applied in the vicinity of the cut line.

In another particular case, the method for may include cooling the piece of polysilicon after or during the application of the predetermined laser beam.

In still another case, the method may include scribing the piece of polysilicon prior to applying the predetermined laser beam. In this case, a scribe line may be buffed or polished prior to applying the predetermined laser beam. Further, the piece of polysilicon may be scribed on both of a first and second surface to aid in cutting or cracking. Still further, the scribing may be for only a portion of the cut or cracking line. In some cases, the scribing may be performed by a laser beam, and the laser providing the laser beam may be the same as or different from that for cutting or cracking. When the laser is the same, the laser may be configured to have a different beam profile and process parameters for each operation. In a particular case, a predetermined laser beam may be used to create a scribe line and a second laser is used to perform cracking in rapid succession within a single cutting operation. In this case, the scribing laser may be a pulsed laser and the feed rate of the scribing process is matched to the feed rate of the cracking process by adjusting the firing rate of the pulsed laser. It will be appreciated that a piece of polysilicon may be scribed and cut or cracked in rapid succession, for example, using two lasers arranged in-line.

According to another aspect herein, there is provided a system for preparing polysilicon slim rods, the system including: a fixture to hold a piece of polysilicon; and at least one laser adapted to direct at least one laser beam at the piece of polysilicon to separate at least one polysilicon slim rod from the piece of polysilicon.

In a particular case, the piece of polysilicon is a flat slab having a thickness approximately equal to the thickness of the polysilicon slim rod.

In another particular case, the predetermined laser beam is configured to cut the piece of polysilicon.

In yet another particular case, the predetermined laser beam is configured to crack the piece of polysilicon.

In another particular case, the system may include a cooling system adapted to cool at least one surface of the piece of polysilicon.

In still yet another particular case, the fixture is a vertical holding fixture.

In a further particular case, the system may further include a cradle designed to capture the polysilicon slim rod and protect the polysilicon slim rod from debris.

According to another aspect herein, there is provided a method for preparing polysilicon slim rods, the method including: placing a piece of polysilicon on a fixture; applying a predetermined abrasive jet to the piece of polysilicon; and separating a polysilicon slim rod from the piece of polysilicon.

In a particular case, the abrasive jet may be a water jet. In another case, the abrasive jet may be silicon recovered from a cutting operation.

Various aspects of the present disclosure are described below and other aspects and features will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
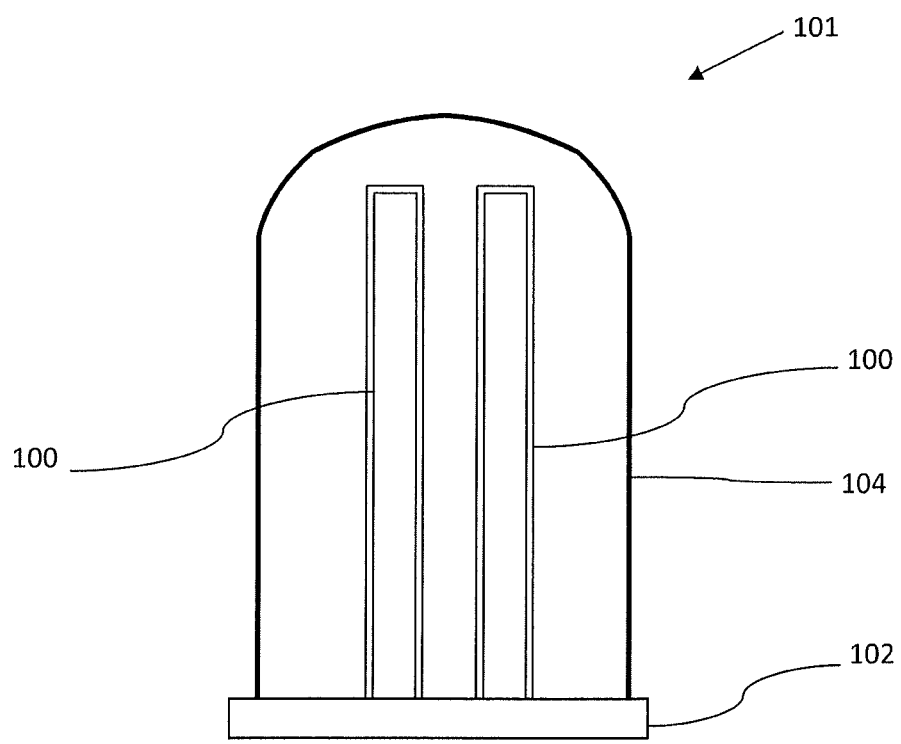
FIG. 1 is a cross section of a reactor and slim rods used in producing silicon.

Generally, the present disclosure provides methods and systems for production or preparation of silicon slim rods. This present systems and methods deal with the processing of polysilicon into strips (slim rods) from which filaments are constructed. In one embodiment, boules of silicon are processed into slabs of appropriate thickness then processed further into roughly square strips (slim rods) using one or more of the methods described below. These systems and methods can be generally divided into cutting and cracking, both intended to be zero or low kerf methods. The cutting methods described are intended to produce a reduced kerf and less breakage resulting in greater material utilization. The cracking methods described may produce a zero width kerf resulting in even greater material utilization. Cracking methods consist of using a laser to create internal stress in the material in order to propagate a crack in a controlled fashion. Cracking may be preceded by a scribing operation to create a point of initiation of the crack.

By reducing or virtually eliminating kerf loss, it is possible to make approximately 18-20% more slim rods from a boule with a commensurate reduction in the number of boules recycled into slim rods. For example, if 1 in 48 boules are normally required, only 1 in 56 would be needed for an approximately 0.3% increase in production capacity with approximately 15% reduction in slim rod manufacturing cost.

As noted above, the described systems and methods are intended to minimize contact with the material, reduce kerf loss and tool wear, and/or provide greater process speed. Various contemplated methods of separating silicon slabs into slim rods include: (a) fluid jet cutting with abrasive grit where the fluid is air and the grit is silicon, silicon oxide, diamond, carbide, or other non-contaminating grit; (b) fluid jet cutting with abrasive grit (as in 'a') where the fluid is water; (c) laser cutting using a water-guided laser beam; (d) laser cutting with or without a cover gas and with or without an assist gas; (e) laser scribing or grooving followed by mechanical stress (scribe and break); (f) laser scribing or grooving followed by laser induced stress cracking with scribes or grooves on one or both faces of the material; and (g) laser induced cracking without scribing or with a seed scratch.

Some of these methods include additional aspects, for example: (a) grit cutting using ultra-pure silicon grit possibly produced from scrap material; (b) use of laser induced stress alone to cause cracking; (c) scribing or grooving on both surfaces; (d) use of an assist gas such as hydrogen producing a volatile product of laser cutting; or (e) possible oblique alignment of the laser to facilitate cracking.

The processes described herein are particularly intended to be used for separation of millimeter-scale silicon; for instance, cutting silicon slabs in the order of 6 to 12 mm thick with a length in the order of 1000 to 2500 mm into slim rods in the order of 6 to 12 mm in width.

Some intended features of the described methods include: (a) possible use of clamping to stabilize lateral forces and or apply compression across the cut line, which has been shown to reduce breakage and permit feed rates to be increased; (b) in the case of laser induced cracking, surface texturization to facilitate efficiency and uniformity of energy coupling to provide a better quality and faster process than conventional methods. Texturization may be done by various means including chemical etching, laser stippling, shot blasting, etc.; (c) For laser induced cracking, use of a non-circular laser spot with power distribution optimized to the process requirement; (d) Laser induced cracking without the use of a scribe, groove, chip or other feature to initiate or guide the process; (e) In the case of laser scribing or grooving prior to cracking, scribing or grooving of opposing surfaces to facilitate separation speed and edge quality; (f) In the case of laser grooving or cutting, use of a cover gas to reduce plasma screening and/or formation of oxides; (g) In the case of laser grooving or cutting, use of an assist gas to produce volatile and/or low optical absorption silicon compounds to reduce plasma screening and/or promote material removal; (h) In the case of scribing or grooving prior to thermal cracking using two dissimilar lasers for each purpose (for example, 1. scribing or grooving, 2. thermal cracking) either operating separately or in tandem; and (i) In the case of laser cutting, use of stress cracking to complete the cut in order to prevent dross formation on the opposite surface where stress may be applied by Mechanical means or by adjusting mechanical constraints such as holding clamps near the end of the cutting process;

Various materials are contemplated for assist gases to facilitate laser cutting, including various gases that produce volatile silicon compounds by surface reaction. Assist gases may also assist with increasing material removal rate and/or reducing plasma absorption of laser energies described herein. Materials that may be used for fluidized abrasion includes crushed silicon, hardened silicon flakes and/or kerf waste from saw cutting operations.

A clamping mechanism to facilitate laser cutting with variable application of force is also contemplated, as are non-spherical optics that are intended to optimize the laser spot shape for various operations including scribing, cutting and thermal cracking. A further alternative includes a tandem beam delivery system for delivery of a plurality of laser beams to perform serial processes within one pass of the silicon slab.

Advantages of the systems and methods herein may allow for: improved material utilization; reducing or eliminating consumables; reducing or eliminating tool wear; reducing or eliminating the need for liquid coolants; reducing breakage of rods; or increasing feed rate.

FIG. 1 illustrates a cross-section of a conventional reactor 101 showing two U-shaped filaments, sometimes called a hairpin 100, mounted to a chamber base 102 and enclosed by a pressure vessel 104, sometimes called a bell jar. The hairpins 100 are mounted to feed-throughs, through which electrical current is applied, such that the hairpin 100 may function as an incandescent filament. Typically, other items such as gas supply and return lines are also introduced through the base 102. A quartz filament or other heating element may also be provided, which are used to preheat the hairpins 100. In operation, a gas is provided to the pressure vessel 104 such that material is deposited onto the filament by CVD until it grows to a desired cross-section and is removed. The process produces cylindrical boules of polysilicon for further processing.

Figure 2:
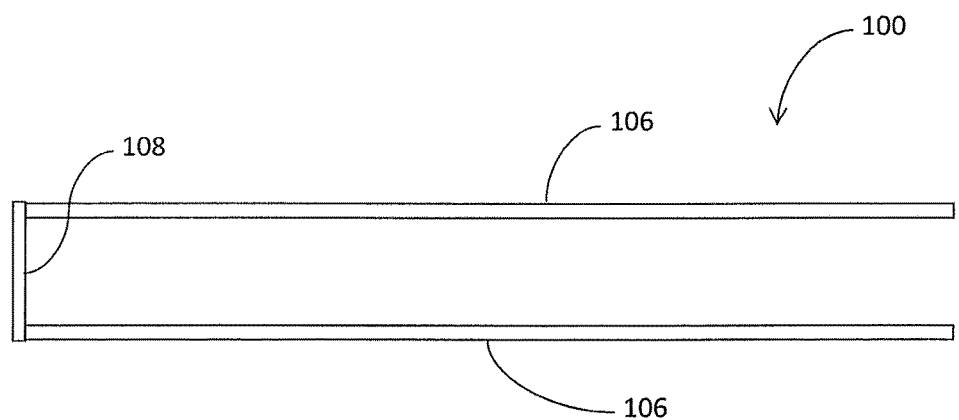
FIG. 2 is a plan view of a conventional hairpin.

FIG. 2 is a plan view of the hairpin 100 and its composition consisting of slim rods 106 and a cross link rod 108. Slim rods 106 are long thin bars of pure silicon that form the seed for the growth of CVD deposited pure silicon. The cross link rod 108 is a short rod, which links a pair of slim rods 106 forming a hairpin 100. Link rods 108 are attached to a pair of slim rods 106 to complete a U-shaped/hairpin structure and complete a path for electrical current through the filament.

In order to produce slim rods 106, a boule produced by the above method is typically cut up to produce new slim rods. An objective of methods and systems disclosed herein is to improve the manufacturing process for producing slim rods.

Figure 3:
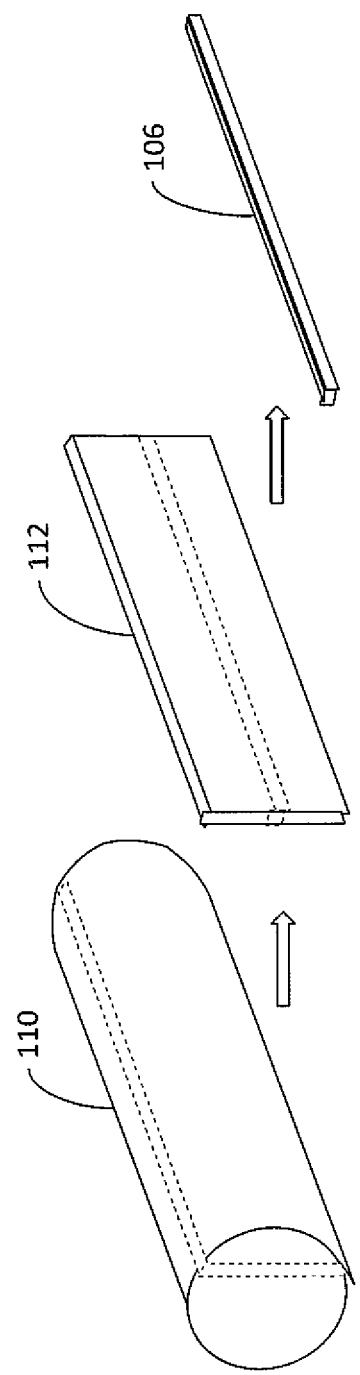
FIG. 3 illustrates a slim rod production sequence.

FIG. 3 illustrates a slim rod 106 production sequence for converting a boule 110 into slim rods 106. This figure shows the typical sequence for converting boules 110 into slim rods 106 which may be produced by one or more of the methods and the corresponding systems described herein. A boule 110 of pure polysilicon is the starting point for a slim rod 106 production process. It may begin as a cylindrical shape (as formed in a reactor such as that in FIG. 1) or it could have been processed into a brick (typically square or rounded square cross section) prior to processing. A slab 112 is then processed from the boule 110 or brick of polysilicon. Subsequently, slim rods 106 are processed from the slab 112. It will be understood that the raw material used to prepare the slim rods may also be provided by other methods or techniques but for purposes of this disclosure, the feed material is from a boule as described above.

A laser induced thermal cracking method can be effective for converting slabs 112 into slim rods 106 with low or no kerf loss. In this process, an approximately collimated laser beam is passed through the silicon slab in a relatively diffuse spot with the objective of creating substantial internal pressure in the silicon slab, which is then relieved by the formation of a crack in the silicon slab. With sufficient control of the process, a crack is formed along the length of a slab resulting in separation into two parts. Various lasers may be employed with those having wavelengths that are moderately absorbed by silicon being preferred.

Figure 4:
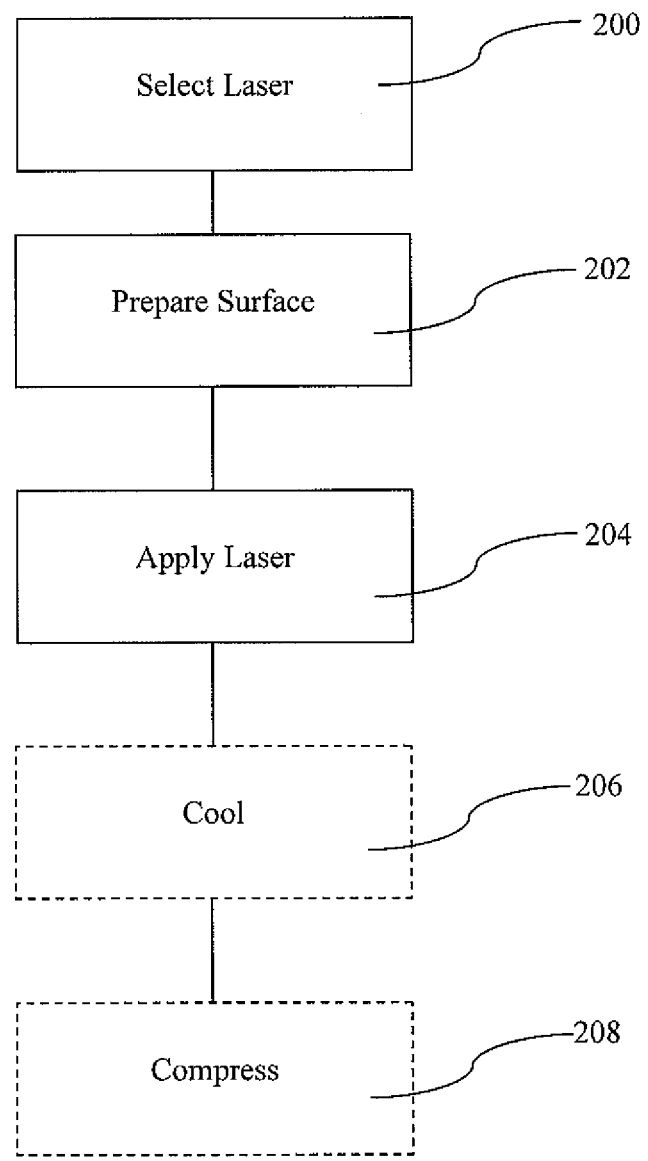
FIG. 4 is a flow chart illustrating a method for producing slim rods from laser cracking

Example elements in a laser cracking process are shown on the flow chart of FIG. 4 and include selecting an appropriate laser by wavelength and mode of operation 200, surface preparation 202, applying a laser 204, application of cooling 206 and application of compression 208.

In one example, a carbon dioxide ($CO_2$) laser may be selected. Silicon is fairly transparent at wavelengths near 10 microns but is still substantially absorptive, for example, approximately ⅓rd of the laser energy is absorbed in 3.5 mm of polysilicon (approximately ½ the thickness of a typical slim rod produced by this process). This enables thermal stress to be developed effectively within the core of the material. Feed rates in excess of 50 mm/sec have been demonstrated using laser induced thermal cracking. $CO_2$ lasers are effective in this application as beam quality is generally irrelevant and laser power is very affordable.

In another example, a fiber laser may be selected. Preferably, a laser operating at a longer wavelength, for example, closer to 1070 nm, is used so that there is a balance between transmission and absorption concentrating the thermal stress into the core of the material. Silicon transitions from high absorption to high transparency with increasing wavelength in the neighborhood of 1050 nm and above. Fiber lasers capable of somewhat longer wavelengths are therefore preferred.

Yet another alternative is to use a laser diode, typically fiber coupled, which can be in the range of approximately 1070 nm to 1100 nm. A laser diode in this range can generally provide a desirable transmission to absorption ratio.

Surface reflection can introduce perturbations into the process, particularly reflection of incident laser energy at the first surface of the piece of silicon. This can be controlled or be made more repeatable, by conditioning the surface prior to the laser process (202). Surface texture may, in some cases be a useful byproduct of saw damage from cutting of slabs. Otherwise, texture may be applied using chemical processes generally similar to those used to texturize polysilicon wafers and those used to clean slim rods after cutting. Alternatively, texturing can be produced by stippling the surface with a shorter wavelength laser; for example, a pulsed green fiber laser has been shown to be a good method of texturizing polysilicon directly or inducing surface damage that promotes chemical texturization.

When using the laser induced cracking method, this surface preparation aids in achieving a well controlled cleave of the material by stabilizing surface reflection. This also minimizes back reflection towards the laser optics. Surface(s) 338 of the slab 112 (e.g. as in FIG. 5) may have been prepared to enable uniform coupling of laser light into the material along the cut line. In order to produce a uniform and reproducible result, the surface 338 of slabs 112 may be prepared to facilitate coupling of laser light into the bulk of the material. This preparation may be done on one or more surfaces using one or more texturization methods such as anisotropic chemical etching, laser stippling, and the like. If slabs 112 are saw cut, residual saw damage may be exploited to create a textured surface.

Another aspect of surface preparation 202 is to reduce or eliminate any surface defects greater than a critical size that could cause crack propagation to be interrupted or run off course. Such defects may be the result of saw damage or other damage. Etching for purposes of achieving uniform reflectance may also be used to reduce or remove larger surface defects. An alternative process may be to buff the surface in the vicinity of the cut line with a mildly abrasive buffing tool.

In the method of laser induced thermal cracking, a roughly collimated beam is used to direct a great deal of energy into a small area but not so small that silicon slabs begin to be ablated, especially as plasma screening can negatively affect the process. A non-circular laser spot extended in the direction of cutting may be advantageous. A slight longitudinal taper of the beam may be used to control the depth of crack initiation.

Internally developed stress causes the material to separate by crack propagation as the laser spot is scanned over the material 204 (or the material is passed under the laser). This crack takes on a vertical strike, although not necessarily near the ends of the boule 110. In practice, up to 25 mm of material may be broken out or poorly cleaved at the start of the cut and a lesser amount of chip-out typically occurs at the opposite end. This results in some scrap; however, the scrap is typically only approximately 1% or so of a slim rod, which is significantly less scrap than with the conventional sawing processes. This scrap can be reduced by preparing the slim rod 106 surface 202, by at least partially scribing the slab near each end with a tradeoff between process complexity and scrap rate. A secondary operation for trimming away the irregular ends of the rods produced in this process may be required, which could be a laser cutting or scribe and break process as described below. It should be noted that scrap in the form of cut-offs is still valuable as the scrap can be used as feedstock for downstream processes unlike saw dust: in the ingot casting process, various size pieces of pure polysilicon are fed into the crucible so these moderately large pieces are useable.

The method relies on achieving a balance between transmission and absorption. For some laser wavelengths, a large portion of the laser beam may not be absorbed. This portion can be collected and reflected back into the material, possibly with some additional collimation.

Stress gradients may be further internalized by cooling the surfaces of the slab 206. A simple method of cooling consists of air cooling jets applied to the first surface and a cooled chuck contacting the second surface or cooling jets also applied to the second surface. A key aspect of this method is the ability to constrain crack propagation to follow the path of the laser tool and to prevent induced stresses acting in undesirable directions which can result in poor quality or lack of straightness of the cut as well as break-out resulting in broken rods. This is largely prevented by the application of compression 208 transverse to the cutting direction, typically by means of a clamping mechanism which maintains a controlled force across the cut line.

Cooling may be applied to one or both surfaces by a cooling system 340 (e.g. as in FIG. 5) in the neighborhood of the laser beam 336 to assist in developing the desired stress gradient. The cooling system 340 may be jets of air or gas which may be chilled and/or humidified. The cooling process may be used to assist in creating the desired stress profile. More typically, it is used to prevent the bulk material from heating during multiple passes in rapid succession. Cooling may be supplied from the laser side and may possibly be integrated into the laser nozzle. Cooling may also be supplied from the fixture 330.

Cooling may be provided to facilitate the goal of developing substantial thermal compression originating in the core of the material. The cooling may be supplied by a non-contact method, such as a flow of air or gas that may be cooled actively or by expansion. In one example, the gas flow may be humidified in order to increase its thermal capacity. Cooling can be applied to one or both surfaces depending on the profile of laser energy absorption.

This method may be desirable as compared to laser cutting in that plasma screening is not an issue nor is removal of an ablation plume, laser beam quality may be less important and throughput is intended to be higher. It may be accomplished without the need for a cover gas, assist gas or debris removal system.

Figure 5:
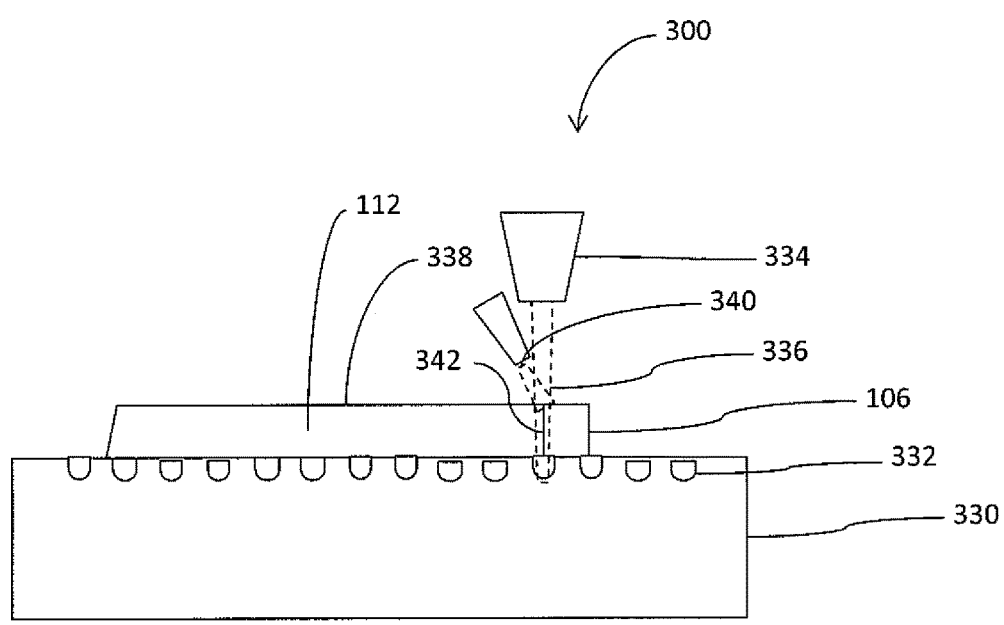
FIG. 5 illustrates slim rod laser cracking.

FIG. 5 illustrates slim rod laser cracking using laser induced cracking. This is a schematic end view of the basic apparatus 300 for conversion of slabs 112 to slim rods 106 using laser induced thermal cracking. Slabs 112 are placed on a chuck and irradiated by a laser to induce internal stress, which is relieved by the formation of a vertical crack. Relative linear motion between a laser nozzle 334 and a holding fixture 330 causes a rod of material to be separated from the slab 112 producing a cut with no kerf. Although only a single slab 112 is shown, multiple slabs could be placed onto a single fixture 330 for processing. Furthermore, multiple laser nozzles 334 could be configured in order to process multiple slabs concurrently.

The holding fixture 330 is shown and used to hold and support slabs 112 and slim rods as they are formed. The holding fixture 330 may be a simple planar surface, which may use vacuum to hold the material in place. The holding fixture 330 may be mounted on a moving stage in order to position the material as needed; alternatively, the stage may be fixed with the laser nozzle 334 mounted on a moving stage or both items may be mounted on stages. Holding fixture reliefs 332 are included on the holding fixture 330. The holding fixture reliefs 332 may be along the cut lines. Reliefs 332 in the holding fixture 330 provide a place for excess radiation to accumulate: since local heating will occur, it may be desirable to avoid contact with the material as this could have an unwanted influence on the thermal gradient in the material. Reliefs 332 may also be useful to facilitate access to the back surface of the part, typically to apply cooling. In one example, this may also be a reflector which recycles excess energy back into the slab 112 and could also refocus a laser beam 336.

The laser nozzle 334 or termination of beam delivery optics is shown in FIG. 5. The laser nozzle 334 formats and delivers the laser beam 336 to the target material. Typically, the laser nozzle 334 provides a nearly collimated laser beam 336 arranged so that high fluence is produced in the core of the material, possibly assisted by reflections from the holding fixture 330. This arrangement is different than what is generally used for laser machining as the optical elements may be anamorphic and even non-linear in order to provide the desired beam profile. The laser beam 336 is designed to penetrate the slab 112 and induce internal stress sufficient to produce cracking. The laser beam 336 is concentrated into a region of the core of the slab 112. The laser beam 336 has an appropriate geometry using wavelengths where the light is substantially transmitted but also partially absorbed. In this method, the material may be cracked by thermal stress alone, i.e. without any previous preparation such as scribing or scoring 336 of the slab, which is accomplished by appropriately shaping the laser beam 336.

A crack 342 is formed that is more or less centered along the line of the laser beam 336. Near the start and end of a cut control may be poor, however, over the majority of the cut the crack 342 is essentially guided by the laser beam 336. In this example, the crack 342 is initiated by simply using the laser beam 336 to create a critical defect and then propagate that defect along the length of the slab using the laser beam 336 profile only to guide the cut. The slim rod 106 may then be separated from a slab 112.

For the conversion of slabs into slim rods using laser induced thermal cracking, a relatively simple apparatus is sufficient. A slab is held in a fixture and acted upon by a laser with a cut being formed by relative motion of the laser nozzle and the slab along a generally linear path. Slabs are processed by either moving the fixture under a laser nozzle or moving a laser nozzle over the slab in a generally linear direction. Generally, in order to reduce a slab into slim rods several parallel cuts are made.

Relative motion means that either the slab and/or holding fixture and/or tools are moved so that a tool or tools pass along a cut line or cut lines in the slab. For example, tools can be mounted on a multi-axis motion stage with the slab held in a fixed holding fixture. Alternatively, the tools may be mounted on a motion stage with the holding fixture also mounted on a motion stage. Alternatively the tools may be mounted on a fixed support with the holding fixture mounted on a multi-axis motion stage. Additionally, slabs may be held in a fixed position on the holding fixture or moved relative to the holding fixture.

Required motion includes moving the tool or tools relative to the slab (or vice versa) in order to create a cut line. Additional required motion includes moving the tool or tools laterally relative to the slabs, or vice versa, to index from one cut line to the next. Other motions may also be provided to facilitate loading of slabs into a holding fixture and discharging pieces separated from the slab including scrap and slim rods. Also, the cutting process itself may require additional motions such as positioning tools relative to the slab, for example, orientation and distance.

The process may be expedited by using more than one laser nozzle; for example at least two laser nozzles acting identically on opposite edges of the slab. A sequence of cuts is performed by indexing the slab relative to the laser nozzles or vice-versa between passes until the slab has been reduced to slim rods. An initial cut may be needed in order to remove the rind (curved edge portion) along with a way of discarding this scrap. Additional embellishments may include provisions for cooling surfaces, provisions for registering and aligning slabs to the equipment, a machine vision system for example, provisions for removing chips and scrap, particularly at the ends of the cuts, etc. Additional items may include elements for loading and unloading material automatically, inspecting finished slim rods, etc. Also, a machine might include provisions to load and/or process several slabs at one time.

Slabs are held in a holding fixture, which may be a resting place, a vacuum chuck or a clamping mechanism. The fixture may be slotted along the cut line to provide an outlet for chips and/or containment for excess laser energy and/or access for cooling of the surface in contact with the fixture. Alternatively, a generally vertical holding fixture where a slab rests in a slot may be used, this fixture may permit free access to both sides of the slab during processing; in this case, the floor of this fixture may be movable in order to index the slab from one cut line to the next.

A number of different laser types have been shown to be effective in this application. Key attributes are that the laser should provide a considerable amount of energy that is absorbed in the bulk of the slab and that the laser energy should not, for the most part, exceed the damage threshold of the slab material. Continuous wave (CW) or quasi continuous wave (QCW) lasers are preferred, although long pulse lasers where the ratio of peak power to average power is sufficiently low may also be effective. Lasers with wavelengths that trade off absorption versus transmission, for example, lasers that penetrate the material but are still absorbed efficiently in the material's core are preferred, such as $CO_2$ lasers near 10 micron wavelength, which can exploit a minor peak in silicon absorption. Alternatively, fiber lasers near 1070 nm can operate in the region where silicon is transitioning towards infrared transparency. Yet another alternative is to use a laser diode or other lasers, particularly infrared lasers; however, lower absorption must be offset by higher laser power. Unlike many other laser machining applications, beam quality is not a particularly important parameter as a relatively large/diffuse laser spot is used.

The optical beam delivery system must produce a relatively large spot that has a relatively consistent intensity throughout the bulk of the material or has somewhat higher fluence near the center of the material. A preferred beam may be nearly collimated or slightly converged, although the optimum profile will depend on the ratio of absorption to transmission. There may be some variance depending on the amount of cooling applied to first or second surfaces.

In addition to a preferred distribution of fluence along the beam, the spot may be advantageously shaped, typically elongated in the direction of cutting. The beam delivery system may incorporate anamorphic conventional optics or other known optical systems commonly used for formatting of laser beams in order to obtain an effective 3-dimensional distribution of laser energy within the material. In one example, two or more fiber delivered lasers may be combined into a linear array to facilitate the formation of an elongated spot with a tunable longitudinal profile. The beam delivery system may be further elaborated by the provision of a back side beam stop, which may also be a reflective optic that directs excess laser energy back into the slab.

Although clamping is not essential to the process, clamping may be employed to stabilize or assist the cracking process. For example, a slight bending moment may be applied that biases compression through the thickness of the material, typically towards the far side of the material, and/or assists crack propagation and material separation. Clamping may also be employed to provide compression across the cut, particularly near the ends of a cut which is intended to reduce break out that may occur during the cut, particularly at the ends.

One optional auxiliary device is a mechanical scriber or punch that produces some minor surface damage near the ends of a cut. Normally, it takes up to 25 mm of initial cut to establish a stable cutting process with nearly normal strike, which results in some scrap material that must be removed from the slim rod and occasional breakout. Creating a small mark on one or both surfaces for stabilizing the cut nearer to the edges can be beneficial. An inexpensive solution consists of using a hard point such as a diamond point to indent or scratch the surface. In one example, a slab is clamped near each end by a caliper tool with hard points for jaws which is pulled away leaving scribe marks on both surfaces.

Texturization is employed as a primary means of controlling the consistency of the process. Additional feedback devices may be used to stabilize the cracking process by providing a control that enables laser energy to be adjusted during the process. Optical sensors may be included with the laser tool to monitor the process in one or both of two ways: measuring the offset of the tip of the crack relative to the laser beam location so that crack propagation is used as a measure of process efficacy; and/or measuring the internal stress in the material by observing birefringence using polarimetry in the near infrared (NIR) spectrum.

Either of these methods may use optical sensors to follow the tool along with suitable illumination and optics.

In one example, a 10.6 µm 5 kW ($CO_2$) laser operating at 500 Hz is used to separate parts held by clamps along the length of the cut line using feed rates between approximately 500 and 1000 mm/sec, with feed rates near 1000 mm/sec and laser power of about 2500 W being preferred. A nitrogen cover gas is injected coaxially to the laser beam (integrated into the laser optics). The laser is focused into the material and an optical sensor is used to adjust the fly height of the laser to compensate for thickness variation in the slab. In another example, a 1070 nm 2.5 kW CW fiber laser is used to separate parts at feed rates of at least 700 mm/sec.

Figure 10:
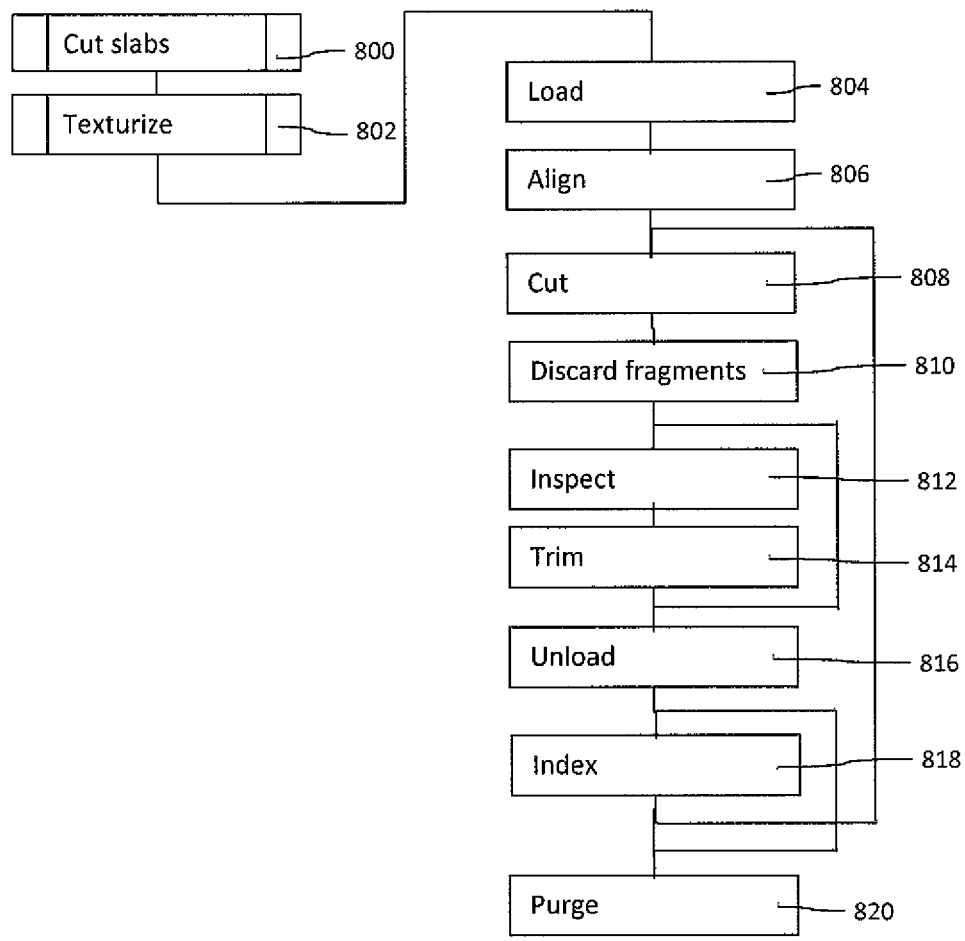
FIG. 10 is a flowchart of a method of producing slim rods.

FIG. 10 is a flowchart of an example process flow for laser induced thermal cracking process and illustrates a general process flow for a slim rod production process utilizing laser cracking to segment slabs into slim rods. Cutting material into slabs 800 is a prior process that segments boules into slabs plus scrap/cut-offs. This process is a precursor to the methods described herein. The conventional method is to use saws to cut boules into slabs. Alternative processes could be contemplated. Sawing produces a certain amount of surface damage that may be beneficial to the laser cracking process and/or exploited by a texturization process 802.

The slabs may be texturized 802 to add consistent texture to the surface of the slab. Putting a consistent texture on the surface may aid in a well controlled laser process. An appropriate texture reduces reflectance and reduces variation in first-surface reflectance losses along the cut-line. Texturization may be produced by a chemical etch process. Anisotropic texturization typically exploits residual surface damage caused by sawing. This texturization process 802 may also be assisted by using a laser to first induce more or less uniform surface damage. Texturization prior to the laser cracking process has a substantially beneficial effect on process quality and yield. After texturization 802 the slab is loaded 804 into the holding fixture for processing.

After loading 804, the slab is aligned 806 to the holding fixture and tooling. Alignment may be mechanical and/or by visual means. The outline of a rough slab may be somewhat irregular. After the slab is aligned 806, the method performs the laser induced thermal cracking process 808 along a cut line. This method is intended to involve no consumable materials and has zero kerf loss.

The laser cracking process generally results in some fragments being produced at the ends of the slim rod which must be removed and discarded 810. This process is generally performed by a brushing action using a brush and/or an air knife. Alternatively, the ends of holding fixture may incorporate traps that open to allow the fragments to drop out. The amount of scrap produced in the method is intended to be small. If desired the amount of scrap can be reduced by scoring or indenting the ends of the slab prior to cutting 808 which reduces scrap but increases process complexity.

Next the slim rod is inspected 812. The slim rod is inspected for quality, for example, width, edge profile, cracks, etc. Then the ends of the slim rod are removed 814. The ends of the slim rod are cut off 814 to produce a slim rod of the desired length and the desired end quality. This may be a laser cutting process or a scribe and break process. Alternatively, this process may be done in a separate station after unloading 816. This step completes the laser cracking process, which is extremely fast and is intended to compensate for the any loss of control over edge quality at the beginning and ending of a cut. If scribe and break is used, the same laser as used for separating the slim rod 808 can be used for separating the ends 814. Alternatively, a second laser may be used for scribing or cutting the ends 814 as well as appropriate control and debris removal measures; however, the length of the cut is small and confined to a small area and can be done quickly and efficiently. For minimum cycle time, this could be done in the unload station 816 rather than the holding fixture.

The finished slim rod is unloaded 816. In the first pass, a rough edge may be removed from the slab 808. If the slab has been cut from an ingot or previously trimmed, this step may be omitted. The slim rod is unloaded possibly to a magazine or other part carrier. Defective slim rods and edge trimmings, if any, may be placed into a reject bin.

An index is added 818 to position the slab with respect to the tooling for a laser cracking pass to separate each additional slim rod from the slab. A slice of material is segmented from the edge of the slab. After the desired number of rods has been produced, any remaining unused slab material is purged or discarded 820. This may depend on the slab condition on input: if the slab has been previously trimmed, this may be a negligible amount of material.

In a further embodiment, for a laser induced thermal cracking method, breakout may be reduced or eliminated by scribing a small portion of the material near each end of the cut. This assisted laser cracking method can be accomplished by laser scribing or less expensively by scribing with a diamond point. Alternatively, given the nature of polysilicon (e.g. small critical crack size), simply producing one or a few divots in excess of approximately 75 microns in size using the impact of a hard point, for example a carbide, diamond or sapphire point, may be sufficient.

The laser induced thermal cracking method may be modified by creating a scratch (scribing) or larger groove (grooving) in the surface of the slab first. This scribe and break method may benefit from the use of a second laser optimized for ablation of the material as opposed to thermalizing the material in order to induce stress.

Elements in this process include scribing or grooving with minimal damage, removal of critical surface damage along the scribe line prior to completing the method as shown in FIG. 4, such as selection of lasers by wavelength and mode of operation, an appropriate combination of beam convergence and working distance. This process requires some coordination between the track of the laser beam inducing stress with the previously formed feature which may complicate the process relative to the benefit. One possible solution is to integrate both functions into a single tool so that a simple mechanical alignment of two tools can be used to provide the required tracking, or in other words incorporate an auto-tracking feature.

The surface can be scribed or grooved on either side; however, the opposing side may be preferred in order to produce a more consistent strike, for example, with less interaction between the two tools. Additionally, both surfaces may be scribed or grooved as opposed to just one side.

One critical parameter is the edge quality of the scribe line: poor edge quality may be a source of uncontrolled cracking, which may result in poor cut quality and broken rods. Better results may be obtained by removing chips and burrs from the scribe prior to cracking. Removing these blemishes may be accomplished by a variety of means including mechanical polishing, chemical etching, laser polishing and the like.

In one example, slabs 112 may be carried on a moving stage past a grouping of lasers, or in an alternative example, slabs may be held in a fixture with lasers transported over the fixture. A suitable fixture may permit lasers to access both sides of the slab in a concurrent process. Scribing at feed rates of 1 mm/sec and greater up to approximately 700 mm/sec have been demonstrated as effective. In an alternative process, scribing or grooving may be done in a separate station. In this case, machine vision or other method may be used to produce alignment between laser tracks. In an example, an Infrared (IR) enhanced camera might be used to look through the silicon to image features such as scribe lines on the opposite side of the material.

In another example, a slab is prepared for cracking by scribing or grooving at least one surface along the length of the cut line. In this example, a slab is held in a fixture and acted upon by a laser with a cut being formed by relative motion of the laser nozzle and the slab along a generally linear path. Slabs are processed by either moving the fixture under a laser nozzle or moving a laser nozzle over the slab in a generally linear direction. The process may be expedited by using more than one laser nozzle; for example at least two acting identically on opposite edges of the slab. In this case, a laser is used to ablate or disrupt a small portion of the surface with the intention of subsequently cracking the material by propagating surface defect through the material. In this case, a second laser may be used to propagate the crack by inducing thermal stress. This second process may be performed in a second pass or in rapid succession to scribing or grooving. In one example, a first laser process is performed to scribe or groove the slab, which is subsequently cracked on an additional pass. In yet another example, the second laser may be pitched to one side by the nominal width of a slim rod so that cracking is performed concurrently with scribing for the next cut. In another example, the second laser is placed behind the first laser so that cracking is performed immediately following scribing. Concurrent scribing and cracking is desirable but depends on matching the feed rate of the two processes. Advantageously, scribing or grooving will typically have a higher potential feed rate but can be throttled back by controlling pulse frequency. The advantage of performing both scribing and cracking in the same station is that coordination of the laser tracks is relatively simple.

The scribing or grooving laser may be selected from a broad range of options. The primary considerations are high absorption in the material and high peak power. This is generally obtained by using a small spot size and short pulses. Note, since these properties are antithetical to those required for laser induced thermal cracking, a different laser and beam delivery would be typically required. Some commonly available examples include diode lasers in the 800 to 1000 nm range, green fiber lasers, frequency doubled YAG lasers and generally any laser with beam quality capable of pulsed operation in the range of approximately 200 to 1020 nm. Other lasers may be applied, in particular some high power lasers at about 1050 nm and even lasers at 1064 nm have been shown to be capable assuming sufficient peak pulse power and fluence; however, lasers in the preferred range (200 to 1020 nm) are less likely to produce unnecessary thermalization effects and require less power toaccomplish the desired result. In this instance, lasers with good beam quality and, in particular, able to be focused into a small spot are preferable. The beam delivery for scribing or grooving should typically produce a well focused spot on the surface of the material in order to produce a well defined structure. Advantageously, an elongated spot may be used to produce a scribe line with less pixelization and smoother edge contour, which may be desirable.

Since scribing or grooving results in removal of material and a debris removal system may be desirable. This debris removal system may consist of a push/pull system, where a gas flow is used to push debris towards vacuum exhaust ports or at least a vacuum head to draw off debris. Since the amount of material removed is small, and plasma screening can be negligible, a rudimentary debris removal system may be sufficient. In one example, a coaxial laser nozzle with gas jets and annular vacuum ports may be used. Alternatively, a simple vacuum nozzle following the cut line may be sufficient. In a typical debris removal system, exhaust debris is captured in an inline filter.

If laser induced thermal cracking is used to complete the cut, then the remainder of the system details will be similar to those for a system that does simple laser cracking (above) or parts may be moved from a scribing/grooving station to a cracking station. It may be preferable to scribe or groove the surface that is opposite to the laser used for thermal cracking. In a station performing both processes, laser nozzles may operate on opposing sides of the slab with a suitable holding fixture.

In one example a 1064 nm 90 W laser operating at 10 kHz is used to produce a scribe line using 1 to 3 passes at feed rates of 1 to 100 mm/sec. A mechanical buffing wheel was used to subsequently clean up the scribe. Mechanical clamps were used to hold the material while applying a bending moment to separate the pieces. In another example a 1050 nm 100 W laser operating at 10 kHz is used to produce a scribe line using 1 pass at feed rates of 1 to 100 mm/sec. A mechanical buffing wheel was used to subsequently clean up the scribe. A 1070 nm 2500 W CW fiber laser is used to separate the pieces at a feed rate of 16 mm/sec up to 700 mm/sec. In yet another example, a sharply focused 980 nm fiber coupled diode laser is used for scribing while a CO2 laser is used for cracking. In yet another example, a 1064 nm laser is sharply focused on the surface to produce a scribe line at feed rates of up to at least 2000 mm/sec and then switched to a wider nearly collimated beam to perform cracking. Other suitable laser combinations may be contemplated.

Figure 11:
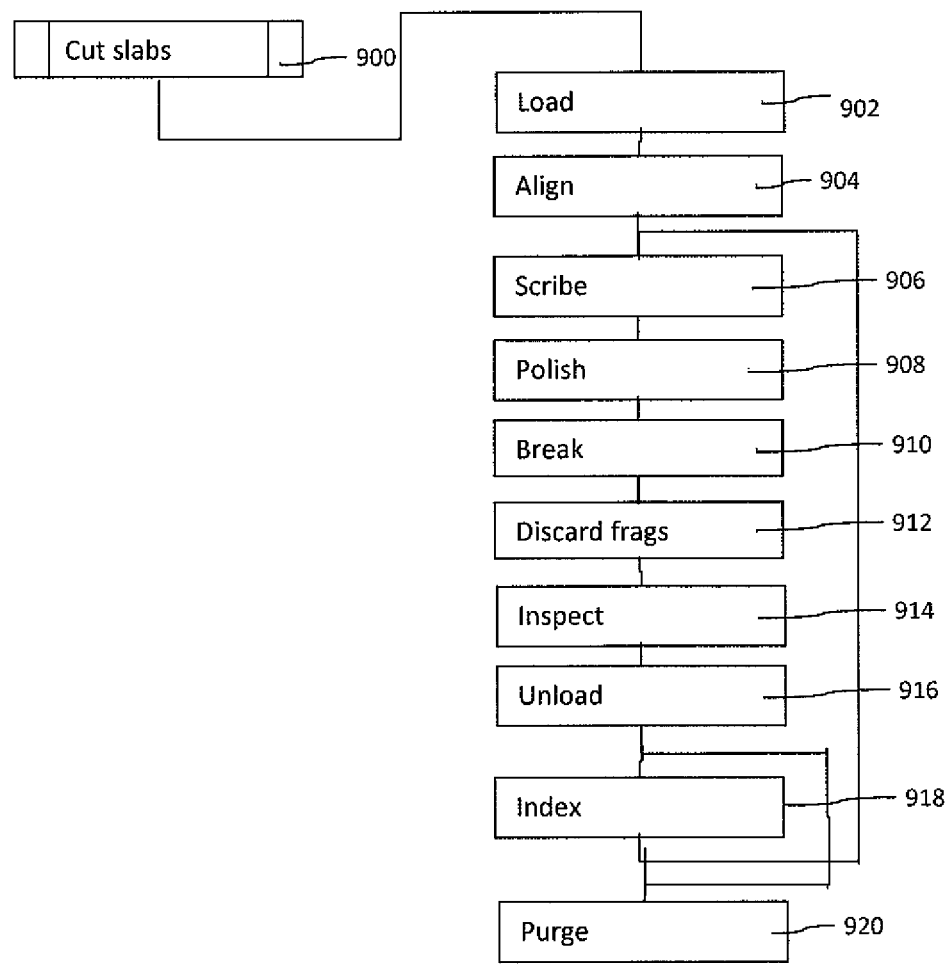
FIG. 11 is a flowchart of an alternative method of manufacturing slim rods.

FIG. 11 illustrates an example process flow for a scribe and break process. The flowchart provides an illustration of the general process flow for a slim rod production process utilizing laser cracking to segment slabs into slim rods following scribing. Although this method may be more complex than laser cracking as described herein; however, yield may be improved and there is relatively little damage at the ends of the rods (as compared to actual breakage with simple laser cracking). Mechanical breaking is an effective alternative; however, laser cracking is easier to control, particularly with uneven slab thickness and requires less mechanical apparatus.

As in FIG. 10, the slabs are first cut 900 from boules. The slabs are loaded 902 into the holding fixture for processing then aligned 904 to the holding fixture and tooling. Alignment 904 may be mechanical and/or by visual means. The outline of a rough slab may be somewhat irregular. A laser is used to scribe 906 the cut line. Depending on details, scribes may be made on one or both surfaces of the slab. Laser tools are moved relative to the slab along the cut line removing or spalling of a small amount of surface material. This method is intended to be a non-contact method with no or limited tool wear issues.

Optionally, edge chips and burrs are removed from the scribe line and the scribe line is polished 908, which has been shown to improve process yield. A mechanical buffing wheel with a fine abrasive may be used which may provide the additional benefit of making surface reflectance near the scribe line more consistent. Alternatively, the scribing laser may be applied with a different recipe to improve the quality of the scribe by laser polishing 908, for example, reflowing the surface and/or vaporizing burrs. This method is advantageous as it is non-contact and has, unlike buffing, reduced or no potential for contaminating the product.

The slab is separated 910 by propagating the scribe line(s) using induced stress. Stress may be applied by inducing a bending moment in the slab across the cut line. Alternatively, laser induced thermal cracking may be applied, with scribing used as a means of improving the quality and yield of the process. This method is intended to involve no consumable materials and has zero or very low kerf loss.

The laser cracking process generally results in some fragments being produced at the ends of the slim rod, which must be removed and discarded 912. This process is generally performed by a brushing action using a brush and/or an air knife. Alternatively, the ends of holding fixture may incorporate traps that open to allow the fragments to drop out. The amount of scrap produced is quite small using this process and consists mainly of some minor corner chipping. The slim rod is inspected 914 for quality then unloaded 916. The slim rod is unloaded possibly to a magazine or other part carrier. The slim rod may be unloaded 916 prior to being inspected 914. The position of the slab with respect to the tooling for a laser cracking pass to separate a slim rod from the slab is indexed 918. A slice of material is segmented from the edge of the slab. After the desired number of cuts have been made, any remaining unused slab material is discarded or purged 920. This purging may depend on the slab condition on input: if the slab has been previously trimmed, this amount may be negligible.

Figure 6:
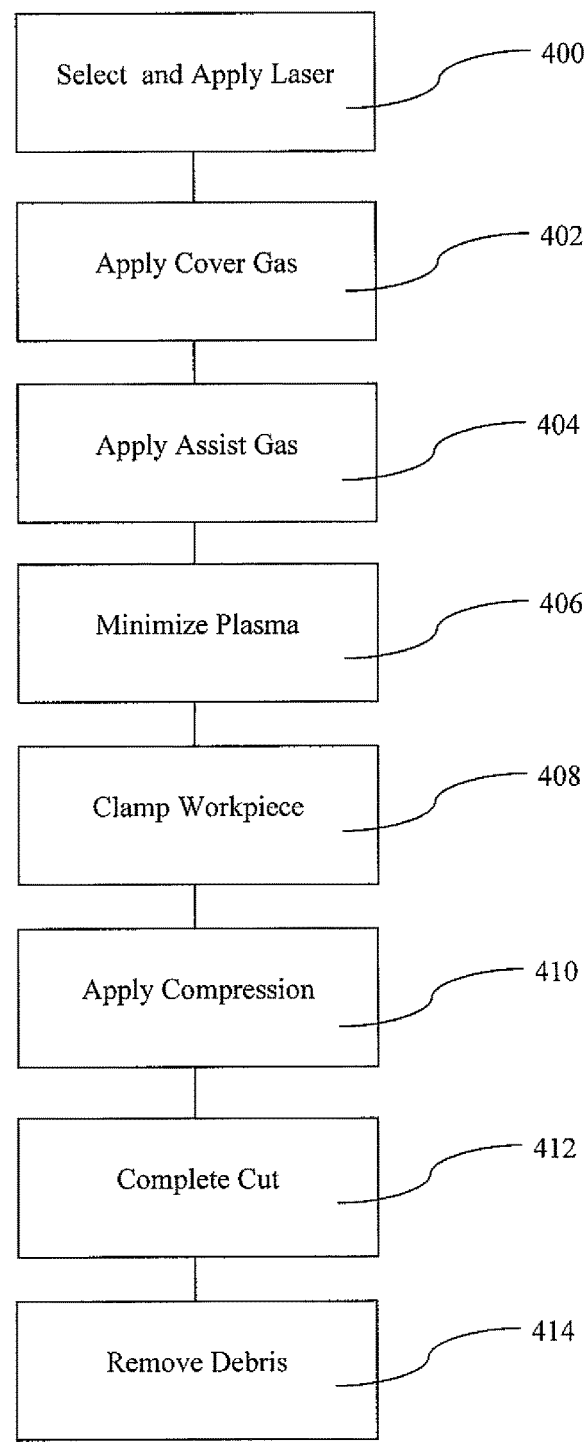
FIG. 6 is a flow chart illustrating a method for slim producing rods from laser cutting.

Laser cutting is another alternative method for manufacturing slim rods. This has been shown to be faster than sawing methods but may require some additional measures, as compared to the previously described laser methods, to produce a desired result. Laser cutting in this way also has some associated kerf loss but the kerf loss is intended to be less than with saw cutting. Surface preparation may be less beneficial in this method and may be omitted. Aspects of this method are shown in the flow chart of FIG. 6 and include proper selection of laser by wavelength and operating mode 400, use of cover gas 402, optional use of assist gas 404 minimization of plasma screening, mechanical clamping of the work piece 408 prior to applying the laser and continuing through debris removal, optional selective application of compression 410, optional completion of the cut by crack propagation 412, and effective debris removal 414.

Cover gas 402 may be used to isolate the cutting process from the ambient environment; when used primarily for this purpose, it is referred to as a cover gas. Cover gas 402 may be used to create a pressure zone and/or airflow and/or neutralize potential chemical reactions. Cover gas 402 is typically integrated with debris removal systems where, in addition to passivating the cutting process, the gas is used to cool and/or transport ejecta away from the cut.

In one example, cover gas 402 is used to suppress ignition of the plasma, which may have undesirable effects. Cover gas 402 may be applied to exclude oxygen, or other possible reactants, and/or to absorb thermal energy thereby preventing ignition. An inert gas may be applied to exclude atmospheric oxygen. Cover gas 402 may be introduced into the cutting area via one or more nozzles, which could be integrated into the debris removal system and/or the laser nozzle. Cover gas 402 injected coaxially with the laser beam delivery system optics may serve the additional function of protecting the laser optics from ejecta.

In another example, where an assist gas is also used, cover gas 402 may be used to contain the assist gas flow or moderate the assist gas's effect. Cover gas outlets are arranged to generally surround the cutting area and the assist gas flow.

US Patent Publication No. 20100252541 A1 details a coaxial laser nozzle system that is able to inject assist gas and cover gas with cover and containment being provided by the cover gas in a laminar or helical flow and also providing an exhaust flow for debris removal.

Assist gas 404 may be used to promote material removal; when used primarily for this purpose, it is referred to as assist gas. Where deep cuts are formed by a laser cutting process, an assist gas may be used to facilitate and expedite cutting. The primary action is to liquefy and vaporize silicon resulting in the ejection of incandescent plasma from the kerf. Assist gases can serve several purposes in this process: a) produce a surface reaction that accelerates ablation of bulk material; b) react with plasma to produce volatile compounds promoting debris removal and reducing surface recast; and c) convert plasma into more transparent compounds thereby reducing plasma screening. Potential assist gases include hydrogen and various halogen compounds. Desirable reactions are dependent on, for example, the wavelength of the laser being used and spectral absorption of reaction products.

Assist gas may be used to promote the cutting process. This assist gas will typically be injected in-line with the laser beam; for example, with coaxial nozzles. In one example the gas may also be injected into the kerf with nozzles placed laterally to the laser beam directed into the kerf. Assist gas injected coaxially with the laser beam delivery system optics may serve the additional function of protecting laser optics from ejecta. Assist gas, particularly assist gas for the removal of silicon may be corrosive and or toxic. Chemically resistant hardware may be provided to inject and recover assist gas.

Laser power exceeding the damage threshold may create thermal stress in the material, which can lead to uncontrolled cracking. One solution is simply to lower the material removal rate or depth of cutting, accomplishing the cut in multiple passes; however, the method may have less impact on feed rate. Providing uniform pressure of isostatic clamping 408 to both sides of the cut has been shown to overcome thermally induced compression of the bulk material and vapor pressure of plasma which prevents unwanted cracking. This clamping also maintains the kerf width so that a self-guiding laser cut is well controlled allowing the laser beam to be reliably directed to the root of the cut by the side walls and the ejection of plasma, which is controlled by the containment of pressure by the side walls is effective. Even with clamping, a somewhat tapered cut may result, where the cut is wider at the entry side: cuts of about 7 mm in depth have been demonstrated with a root of less than 200 micron with an entry of 800 micron using a yttrium aluminum garnet (YAG) laser resulting in an average kerf loss of approximately 500 micron. This loss is intended to be substantially less than with saw cutting and slightly more than with wire cutting. Kerf loss can be reduced by using a laser with a higher beam quality such as a fiber laser.

One issue, particularly with deep cuts, is formation of plasma, which interferes with the cutting process, particularly if plasma also ignites. A cover gas may be applied 402 to prevent ignition and/or push plasma out of the beam path, reducing plasma screening 406 and increasing cutting speed. This may further establish sufficient depth control that the process can be completed by cracking to prevent slag. Nitrogen may be effective for a cover gas although heavier inert gases may be more effective and may be used with a tradeoff between cost and performance.

While material is mostly ejected by vapor pressure created at the base of the cut, material removal may be accelerated through the application of an assist gas 404 that reacts at the surface of the cut or with the plasma, which increases the decomposition of material and/or increases vapor pressure and/or increases the transparency of the resulting plasma. Given the hazardous and volatile nature of possible assist gases and their reaction products this process is preferably performed within an enclosed or contained environment, typically a process chamber filled with an inert atmosphere. Also, debris removal systems are intended to be corrosion resistant and may incorporate active extraction systems.

Another way of expediting the removal of material consists of using double shots. In this approach, a first laser pulse is used to vaporize material while a second pulse (or pulses) is used to further energize the vapor leading to more rapid ejection of plasma. This may be performed by a single laser with suitable pulse control or two successive lasers following in rapid succession.

With laser cutting there is typically some dross or burr on the back surface as plasma pressure is relieved when the cut breaks out. This dross or burr can be removed mechanically or by etching. Preferably, the kerf may be completed by cracking 412 thereby reducing or minimizing material ejection from the rear surface. Cracking can be performed by applying mechanical stress (for example bending); or may consist of using the laser induced thermal stress by releasing or reducing the clamping force for the last pass of the cut, in which case, the previously controlled thermal stress is released resulting in a crack that completes the cut 412.

Unlike cracking processes, laser cutting generally results in the production of fine particulates. Since silicon and silicon ablation byproduct dust can be a hazardous material, an active debris removal system, typically consisting of a forced airflow or gas flow with a vacuum exhaust may be required to remove debris 414. This type of removal system is commonly referred to as a push-pull debris removal system. Typically, the injected gas, which may also serve partly as a cover gas, is used to de-energize plasma from the cut and carry the plasma towards the collecting structure. Exhausted material is trapped in a filter, which may be a multistage filter, and typically incorporates features for safe removal and disposal of captured material.

While this method may be less desirable for conversion of slabs 112 into slim rods 106, mainly due to the added complexity and minor kerf loss, it is intended to be advantageous as compared to saw cutting and much faster than wire cutting.

For laser cutting, a laser optimized for cutting of silicon is used. Additional, the holding fixture should supply a controlled compression force by means of clamps that provide a relatively uniform force along the entire length of the cut line. If using a cover gas and/or an assist gas, gas handling equipment may be provided.

Figure 7:
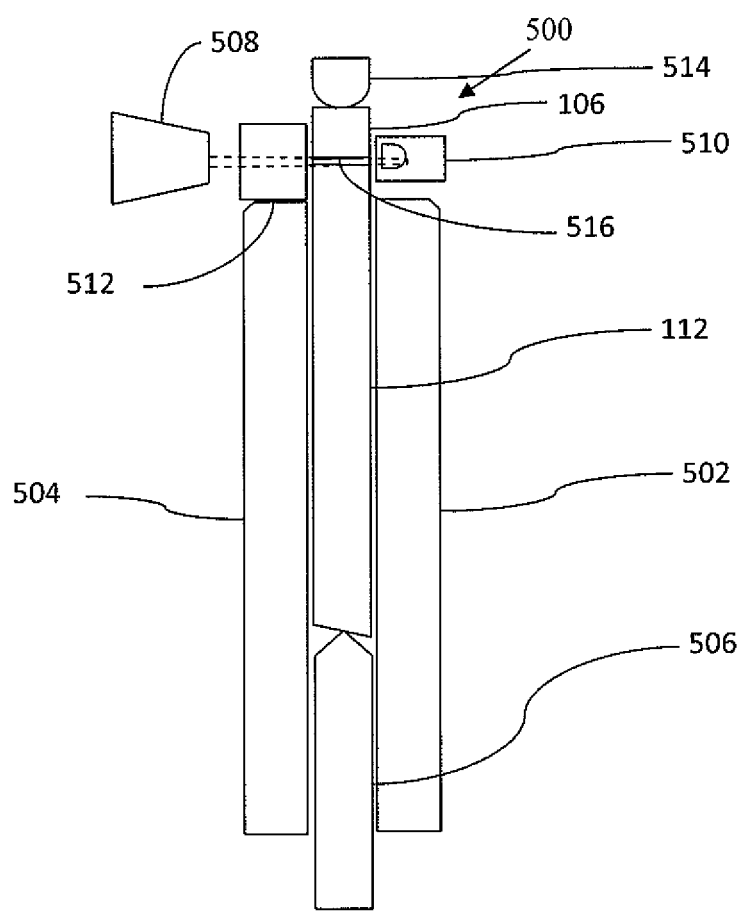
FIG. 7 illustrates a vertical slab holding fixture.

Slabs are held in a holding fixture, which may be, for example, a resting place, a vacuum chuck or a clamping mechanism. The fixture may be slotted along the cut line to provide an outlet for chips and/or containment for excess laser energy. Alternatively, a holding fixture where a slab rests in a slot as shown in FIG. 7 may be used, which permits free access to both sides of the slab during processing; in this case, the floor of this fixture may be movable in order to index the slab from one cut line to the next.

The holding fixture includes a system of applying an essentially uniform compression across the cut line. This may be in the form of one or more compressible pads or inflatable pads that can, with some basic controls, provide nominally uniform and controlled compression force. Additionally, programmable force control may be advantageous, particularly the ability to relieve compression towards the end of a cut or on the last pass so that the cut is completed by cracking, which eliminates blow-out of slag on the back side of the cut. The ability to resist thermal expansion and lateral pressure created by vapor pressure within the kerf prevents cutting from evolving to uncontrolled cracking, which can result in breakage of slim rods as the slim rods are being formed. Alternatively, the material may be clamped using at least one moveable clamp with servo controlled clamping force. Particularly, if cuts are made throughout the entire thickness of the material, a relief in the fixture with some provision for debris removal may be preferred.

The laser may be selected from a broad range of options. The primary considerations are high absorption in the material and high peak power. This is generally obtained by using a small spot size and short pulses and favors lasers in the 200 to 1020 nm range. Note, since these properties are antithetical to those required for laser induced thermal cracking, a different laser and beam delivery would be typically required. Some commonly available examples include diode lasers in the 800 to 1000 nm range, green fiber lasers, frequency doubled YAG lasers and generally any laser with beam quality capable of pulsed operation in the range of 300 to 1020 nm. Other lasers may be applied in particular some high power lasers at about 1050 nm and even lasers at 1064 nm have been shown to be capable assuming sufficient peak pulse power and fluence; however, lasers in the preferred range (200 to 1020 nm) are less likely to produce unnecessary thermalization effects and require less power to function.

A conventional method of improving the rate and consistency of material removal is to use a firing pattern with the purpose of vaporizing material and then further energizing the vapor to promote rapid ejection from the kerf. This method may be possible with a laser that provides a programmable pulse shape and/or shot sequence.

Since this process produces a significant amount of debris, material removed from the kerf, a debris removal system is desirable to capture and safely dispose of the material. A secondary function of the debris removal system may be to sweep ejecta from the path of the laser in order to minimize plasma screening.

Debris removal begins with a vacuum exhaust that collects ejected material. Typically, the exhaust is passed through a filtration system that removes the material from the exhaust airflow. This filtration system may consist of a canister system or multi-stage filter system. A bag-in/bag-out filter system may be preferred for safe handling and disposal. Alternatively, debris may be captured in a wet trap forming a slurry from the scrap material. This method is advantageous since kerf material is commonly recycled into the silicon production process.

Debris removal is typically facilitated by a positive airflow. This airflow may be a flow of air or other gas. Preferably, a high velocity nominally laminar flow is used to drive ejecta towards vacuum exhaust ports in order to minimize plasma screening and recast on the material surface. Heavier gasses may be preferred as a way of effectively transporting ejecta away from the cut line. This type of system is commonly referred to as a push-pull system.

Debris removal may include a containment aspect such as a shroud enclosing the cutting area. This aspect may be closely spaced to the surface of the material, resting on the surface, possibly enclosed by a flexible skirt, or supported by an air-bearing that also serves as a barrier due to high positive pressure. Additional containment may be provided by injecting a high pressure airflow into the kerf near the periphery of the containment.

The debris removal system, therefore, may further incorporate a number of pneumatic devices possibly including nozzles and jets, manifolds, plenums, flow and pressure controls, etc.

Another possible method that has been demonstrated is cutting with a fluidized abrasive or abrasive jet cutting. This method may be less precise and may produce somewhat wider kerf than the laser methods above but can be used to make deep cuts and uses relatively low technology which is inexpensive and non-contact. In this method, the kerf tends to widen somewhat towards the back side of the cut. Reduction of the kerf is a minor advantage as compared to saw cutting; however, improvements in tool wear and feed rate have been shown when compared to traditional cutting methods.

One fluid that may be used is air or other gas. Expansion of the airflow may produce some outward pressure which causes the kerf to expand towards the exit side which may limit the depth of cut possible within a given kerf loss target. Cuts with an entry side width of 100 microns and a draft angle of under 5 degrees are possible.

Another fluid is water which, being uncompressible, can produce a more consistent kerf. One limitation of this method may be the provision of very clean water to avoid contaminating the material during cutting. Yet another laser cutting method, laser water jet cutting, consists of guiding the laser into the material using a thin stream of water. This produces somewhat better control over kerf width and provides the added benefits of debris removal and reduction of plasma screening. Kerr widths of under 100 microns can be achieved; however, feed rates are relatively low, for example, less than about 1 mm/sec. Although slower than other laser methods, laser water jet cutting is still intended to be faster than conventional methods. This method may require a large supply of high-purity water and a water filtration system. Since the water provides immediate cooling, breakage due to thermal stress may be avoided and a simple holding fixture may be sufficient.

On balance, this approach is intended to represent an improvement on current practice due to the reduced kerf loss but may represent a larger cost of capacity than other methods disclosed herein. If high straightness/flatness of the cut is a primary concern this method may be preferred, although, this is not necessarily required in the case for slim rods.

While a variety of abrasive grits may be used, grit composed of high purity silicon itself may be used. This grit may be further toughened by surface treatment such as oxidizing, nitriding, carbo-nitriding, etc. This approach may make use of scrap polysilicon rather than a purchased material.

Where a fluidized abrasive is used for cutting, the abrasive may be composed of scrap material from the production stream that has been processed into grit. This may be produced by crushing or milling of scrap material or other process to render the material into abrasive shards. This abrasive material may be further toughened by forming an oxide, nitride or other dielectric coat which, although toughening may adulterate the grit, introduces no contaminants, that would be problematic to the end use of the polysilicon. This is a practical consideration for production of photovoltaic polysilicon, which is tolerant of some contaminants (particularly multi-crystalline ingot casting with the benefit of vertical stratification).

This method has the advantage of being non-contact with less tool wear than conventional saw cutting. This method has an additional advantage over conventional saw cutting as feed rate can be varied with depth of cut, while saw cutting is limited by surface velocity providing less opportunity to vary or optimize feed rate.

One or more tools may be required to perform the separating process. Additionally, tools may be duplicated to increase throughput by performing the same process step(s) in parallel. Multiple tools may be mounted so that they pass over the same cut line in succession and/or so that they pass along adjacent cut lines simultaneously or in succession. Preferred tools are non-contact in operation, meaning they do not contact the material being separated into pieces. These non-contact tools are an advantage of the methods described herein and intended to minimize the issues of tool wear and contamination of the product. In addition to support, motion and guidance, tools typically require services, which can include laser energy, if not produced within the tool, fluids and/or gasses and vacuum exhaust.

Tools may include cutting tools, cutting assist tools, cleaning tools, process monitoring tools and alignment and setup tools as well as part handling tools.

Auxiliary tooling may include pointing devices such as a laser pointer. Auxiliary tooling may include cameras and lighting for alignment and/or inspection. In some cases, it may be desirable to obtain images into or through the material, in which case a near infrared (NIR) sensitive imaging system may be used, imaging at wavelengths where polysilicon is substantially transparent, for example, in the range of 1100 to 1650 nm.

Fixtures can be used to hold the slab during processing. Various retention methods may be used including gravity, vacuum and clamping. For some processes, rear side relief and/or access may be required. Generally, the slab must be held firmly in order to achieve good control over the process and a straight cut. In some cases, a degree of retention and/or application of force may be needed in order to stabilize the cut, particularly where outward forces are generated within the cut line during the process. In some cases, a controlled and/or variable force is required. Rear side relief may be needed to capture excess energy or fluids and/or debris. Access to one or both sides may also be needed for tooling access. Fixtures may also be used for thermal management, typically by providing a heat-sink or temperature controlled surface for the material. Fixtures may also incorporate features for adjusting the position of the material such as moving datums or clamps. Fixtures may also incorporate features to facilitate positioning the material such as belts, rollers, air-bearing surfaces, etc.

FIG. 7 illustrates a vertical slab holding fixture 500, which may be used for laser based separation of slabs 112 into slim rods 106. A vertical fixture 500 has the advantage of presenting the slab 112 for cutting at a more or less constant position and/or providing equal access to both surfaces and/or minimizing thermal losses into the fixture. This may be advantageous for any process of cutting the slab 112 into slim rods 106. A further advantage is that the fixture provides an axis of motion for positioning the slab relative to the tool. A laser cutting system is shown as an example; however, other systems such as laser cracking, laser scribe and break, etc could be constructed in a similar arrangement. This fixture 500 is designed to hold planar parts for the methods of separating slim rods from slabs described herein and provides the ability to keep the work at a constant elevation. Gravity alone may hold and datum the slab and/or hold the separated strip in place, although additional clamping may be used. The cut line can be accessible from both sides permitting access for various tools such as a second laser, cooling, etc. The cut line is maintained at a constant height which can simplify other tooling, particularly laser beam delivery systems.

The slab 112 cut from a boule or brick of polysilicon from which slim rods 106 are cut is shown in relation to the holding fixture. The holding fixture 500 includes vertical platens 502, 504 that constrain the slab into a generally vertical orientation. The slab may be constrained between two platens 502, 504 but is free to move at least some of the time, for example, by selective application of clamping force. Platens 502 and 504 form the jaws of a holding fixture where a slab also rests on a moveable vertical support 506. Optionally, platen 502 may be a vacuum chuck, which can be used to hold the part rigidly during processing with platen 504 providing retention when vacuum is released. Alternatively, platen 504 could be a Bernoulli vacuum chuck which holds the part from one side making the second platen redundant or only precautionary against loss of air supply; furthermore, this allows the slab to move freely in the plane of platen 502 while held rigidly in the transverse direction while constrained in the vertical and longitudinal direction by support 506 which is advantageous for datuming and indexing the part during processing.

The holding fixture includes a horizontal platen 506 that supports the slab from below and is used to move the slab vertically in order to establish a position for the first cut and to index between cuts. The fixture floor or horizontal platen 506 supports the slab vertically and is used to position it vertically. This support 506 is moved by one or more motion stages. This support may also incorporate a rolling surface, a belt, moving platen, etc to facilitate feeding of slabs 112 into and out of the fixture. Optionally, the holding fixture 500 can be extended to greater length so that this mechanism can be used to move the slab horizontally past a laser. The part is held to a chuck and then the entire fixture is moved to reposition the part or, alternatively, the laser nozzle is repositioned. The second platen 504 may be a simple restraint to hold the slab 112 when the slab 112 is not being held firmly by the first platen 502; on the other hand, the second platen 504 may provide a means for pressing the slab against the first platen 502 when needed and provide a mechanical clamping action when advanced.

A laser nozzle 508 is also included in FIG. 7. Preferably, the laser nozzle 508 provides a nearly collimated beam arranged so that high fluence is produced in the core of the material, possibly assisted by reflections from the holding fixture. An identical laser nozzle (not shown) may be placed on the opposite side of the part to facilitate the establishment of a symmetrical thermal compression profile several different laser nozzles (not shown) may be disposed to either side for more complex processes such as 'scribe and break'. The optical elements may be anamorphic and even non-linear in order to provide the desired beam profile. A stop 510 may be placed on the opposite side of the laser to block the beam and/or reflect it. The stop 510 provides a place for excess radiation to accumulate. In one example, this may also be a reflector which recycles excess energy back into the part which could also refocus the beam.

A debris removal system 512 may be included and may be particularly desirable for laser cutting. The debris removal system 512 removes debris as the cut progresses and may also provide a controlled environment for the process including possibly the introduction of cover and assist gases. The debris removal system 512 may include a coaxial/helical laser nozzle.

A compressible stop 514 may be placed above the slab 112 and slim rod 106 to provide compression during the cutting operation. The compressible stop 514 provides some compression across the cut line and may be a compressible pad or an inflatable bladder or other mechanism to apply quasi-isostatic pressure. A variable or programmable compression may be applied. This compression may be used to facilitate compression cracking and prevent breakage, particularly when removing a thin strip as on the first or last cut. It may be further movable to facilitate unloading of rods after cutting; additionally, it may incorporate elements such as vacuum ports to perform material transfer. In one example, this includes a compressible surface which provides approximately uniform force acting along the length of the slab 112 and the slim rod 106 being separated. For a cutting process, the range of compliance should be small to avoid unnecessary stress across the open kerf. For a cracking process, a larger range of compliance is acceptable. Compressible stop 514 is typically movable in order to facilitate loading of slabs 112 and/or removal of slim rods 106. The laser removes material sequentially producing a groove that typically tapers somewhat and results in a kerf 516.

Figure 8:
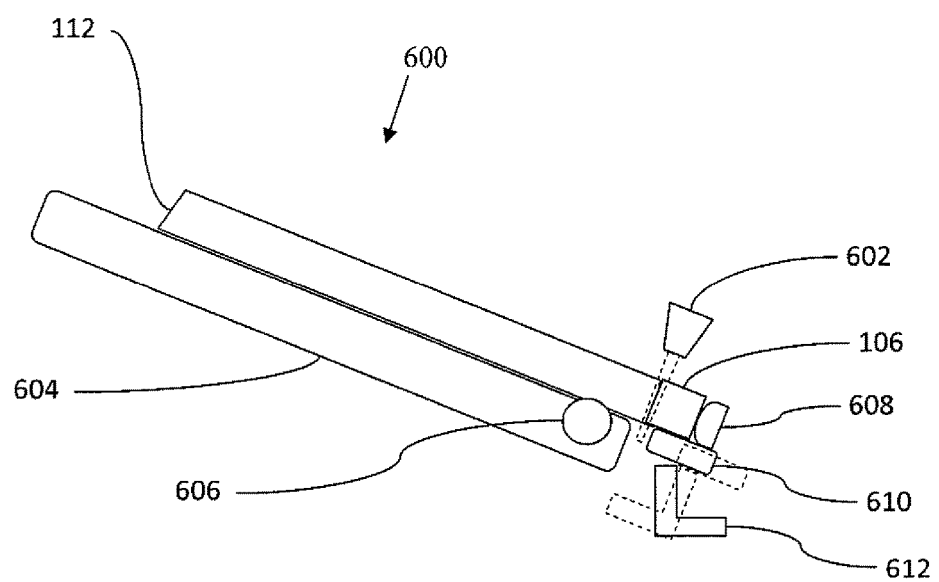
FIG. 8 illustrates a slab processing fixture.

It can be understood that the laser cutting tool 508 could be replaced by a laser cracking tool, or a scribe and break tool. It may be further understood that this fixturing scheme need not be entirely vertical; for example, if inclined towards platen 502, platen 504 may be made redundant without sacrificing the advantage of retention by gravity, particularly if stop 514 incorporates holding vacuum. It can be further understood that tools and other tools may be replicated in a direction normal to the view shown FIG. 8 illustrates a slab processing fixture 600 that could be used with any of the methods proposed. This fixture provides for holding and indexing of slabs with clearance for gravity based clearing of scrap and finished parts. The cut line can be accessible from both sides permitting access for various tools such as a second laser, cooling, etc. The cut line is maintained at a constant location which can simplify the mounting and actuation of tools 602.

A partially processed slab 112 is shown cut from a boule or brick of polysilicon from which slim rods 106 are cut. The holding fixture platen 604 provides a support and positioning for the slab. The slab 112 may be held to the platen 604 by gravity or vacuum or other clamping system. A Bernoulli (push/pull) vacuum chuck may be a preferred example as the Bernoulli vacuum holds the slab firmly by vacuum while permitting the slab 112 to move freely in the plane of the platen 604; optionally, flow can be reversed to turn platen 604 into a vacuum chuck during some operations.

The holding fixture 600 incorporates a feed mechanism 606, which may comprise driven rollers that are used to move the slab over the fixture. Alternately this fixture could employ belts in place of or in addition to rollers. During a cutting process, this feed mechanism 606 could be used to hold the slab in position by friction. Additionally, the feed mechanism 606 could be used to provide a controlled amount of force to create compression across the cut line if needed. In combination with vacuum provided by platen 604 and/or gravity, this element 606 provides a degree of clamping for the slab 112. It may also provide compression or tension across the cut line by driving the slab 112 towards an end stop 608. In addition to indexing the slab between cuts, feed mechanism 606 can be used to move the remaining slab 112 clear of the cut to facilitate the discharge of slim rod 106 that has been parted off.

The holding fixture incorporates a sliding fixture 610 that provides support for the slim rod 106 being separated from the slab 112. The sliding fixture 610 also may act as a gate to release cut-off material at the completion of a cut. This may be a simple sliding surface but preferably is a small vacuum chuck that grips the material being separated from the slab: preferably, this is in the form of a Bernoulli chuck. The sliding fixture 610 may operate as a gate that permits cut off material to be discharged by gravity feed. During indexing and/or discharge motions, this chuck may provide an air-bearing effect to facilitate material movement.

The end stop 608 is provided to support the cut-off piece. The end stop 608 may also be used to assist in providing uniform compression along the length of the cut line. The end stop 608 provides some compression across the cut line. It may include a compressible pad or an inflatable bladder or other mechanism to apply quasi-isostatic pressure. A variable or programmable compression may be applied. This compression may be used to facilitate compression cracking and prevent breakage, particularly when removing a thin strip as on the first or last cut. The end stop 608 may be further movable to facilitate unloading of rods after cutting; for example, the end stop 608 may be rapidly pressurized then evacuated to cause the cut-off to be released.

FIG. 8 indicates the location of the cutting tool 602, which may be any of the items suggested, including a laser nozzle for laser cracking, dual laser nozzles for scribing and cracking, laser nozzles for cutting, a water guided laser nozzle or a fluidized abrasive nozzle. The holding fixture arrangement is versatile, particularly as it provides bottom side clearance for the discharge and possible capture of material using gravity.

A movable cradle 612 is provided to capture finished work by gravity feed. When retracted the cradle 612 provides a gate to protect finished work from further debris and may be used to off-load finished parts. The cradle 612 provides a holding fixture for finished parts. During cutting the cradle 612 is retracted and may provide a gate to direct any debris from cutting into the salvage. When the cradle 612 is deployed finished parts can be gravity fed into the cradle 612; subsequently, the cradle 612 retracts to withdraw the finished part and transfer it to a hand-off. If the ends are trimmed, the cradle 612 may also serve as a holding fixture for this operation so that this trimming may occur in parallel with separating strips from the slab.

Figure 9:
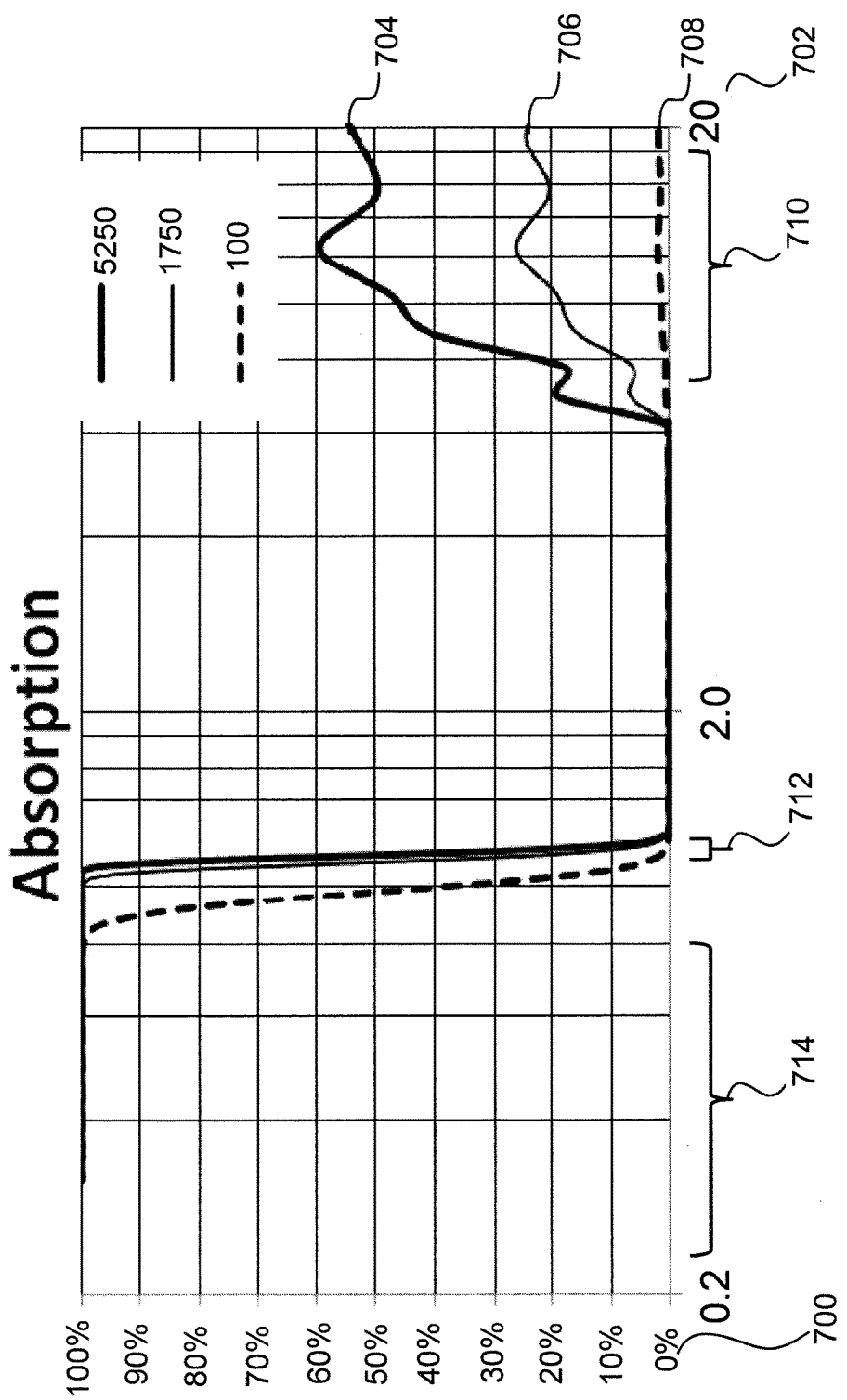
FIG. 9 is a graph showing silicon spectral absorption.

FIG. 9 is a graph showing silicon spectral absorption with various laser wavelengths indicated. Depending on the function being performed, some laser wavelengths may be more desirable than others. A vertical axis 700 indicates the percentage of energy absorbed within a given thickness of silicon. A horizontal axis 702 indicates wavelength in microns. A solid line 704 indicates spectral absorption through ¾ of the thickness of a typical slim rod. This depth is shown for reference. The preferred lasers are selected from those that have substantial spectral absorption throughout the thickness of the slab, but not too close to the surface.

A thin solid line 706 indicates spectral absorption through ¼ the thickness of a typical slim rod. This depth is shown for reference as approximately ¼ of the thickness of a slab. Wavelengths, where this is much less than the absorption in ¾ the thickness 704, are indicative of wavelengths where internal thermal pressure is more easily produced. A dashed line 708 indicates spectral absorption at 100 microns depth and is shown for reference. Laser wavelengths where absorption at the surface is high, as indicated by line 708, are preferred for scribing, grooving or cutting.

A range 710 indicates a range of wavelengths that are preferred for laser cracking where the absorption is moderate permitting high internal thermal stress to be produced by absorption. CO2 lasers are effective as they operate within this range of wavelengths, typically around 9.4 and 10.6 micron wavelengths. This range is intended to be a desirable regime as spectral absorption is broadly consistent and thermal shift in absorption will not have an appreciable effect on the process as heating of the material is part of the process. The use of $CO_2$ lasers provides for relatively inexpensive photons.

An alternative region 712 indicates a range of wavelengths that are preferred for laser cracking where the absorption is moderate permitting high internal thermal stress to be produced by absorption. Certain fiber lasers, such as, neodymium:yttrium-aluminum-garnet (Nd:YAG) and Nd:SGG lasers can operate at approximately 1070 nm and certain fiber lasers and diode lasers that can operate at approximately 1080 nm are examples of appropriate lasers. This region may be a little less desirable than the main range 710; however, the stability of fiber lasers and diode lasers help to make this a useful regime. Fiber lasers and diode lasers also provide an economical solution with the additional advantage of good pulse control.

The graph further indicates a range of wavelengths 714 that are preferred for laser machining where absorption is high. Scribing, grooving or cutting generally requires a regime where surface material is heated effectively so that a surface layer is removed or vaporized efficiently. Lasers that operate at wavelengths less than 950 nm are preferred, although lasers operating at a wavelength closer to 1064 nm may have sufficient power and have been shown to be effective for scribing by being able to offset low absorption with high peak pulse power. Laser scribing or grooving at one wavelength in combination with laser cracking at a second wavelength may be preferred and the systems described herein may be optimized by choosing an appropriate laser for each aspect of the process. Lasers of approximately 1064 nm and approximately 1050 nm are commonly available with high power and good beam quality, although these wavelengths may be less ideal, these lasers may be used due to cost & availability issues. Other alternatives include fiber coupled diode lasers and intrinsically green fiber lasers which are becoming increasingly available.

In the preceding description, for purposes of explanation, numerous details are set forth in order to provide a thorough understanding of the embodiments. However, it will be apparent to one skilled in the art that these specific details are not required. In other instances, well-known structures are shown in block diagram form in order not to obscure the understanding. For example, specific details are not provided as to whether aspects of the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A method for preparing polysilicon slim rods, the method comprising:
   placing a piece of polysilicon on a fixture;
   applying a first predetermined laser beam having a wavelength configured to be moderately absorbed by polysilicon to a first side of the piece of polysilicon, wherein the first predetermined laser beam is formed by at least one laser and configured to produce a non-circular, collimated laser spot extended in a direction of a desired separation;
   applying a second predetermined laser beam to a second side, opposite the first side, of the piece of polysilicon, wherein the second predetermined laser beam is formed by at least one laser and configured to produce a non-circular, collimated laser spot extended in the direction of the desired separation;
   applying a cooling air let to the first side to cool the first side of the piece of polysilicon;
   contacting the second side with a cooled chuck to cool the second side of the piece of polysilicon; and
   separating a polysilicon slim rod from the piece of polysilicon, wherein the polysilicon slim rod has a width between approximately 6 mm and 12 mm.

2. The method for preparing polysilicon of claim 1 wherein the first predetermined laser beam is configured to cut the piece of polysilicon.

3. The method for preparing polysilicon of claim 2 wherein the first predetermined laser beam is configured based on a thickness of the piece of silicon along a cut line, a cut depth, and an effect of the second predetermined laser beam.

4. The method for preparing polysilicon of claim 1 wherein the first predetermined laser beam is configured to crack the piece of polysilicon.

5. The method for preparing polysilicon of claim 1 wherein the first predetermined laser beam is configured such that the process feed rate and laser power are controlled by measuring a crack tip position relative to the first predetermined laser beam.

6. The method for preparing polysilicon of claim 1 further comprising:
applying an assist gas during the application of the first predetermined laser beam.

7. The method for preparing polysilicon of claim 1 further comprising:
applying compression to the piece of polysilicon.

8. The method for preparing polysilicon of claim 1 further comprising:
texturizing at least a portion of a surface of the piece of polysilicon prior to applying the first or second predetermined laser beam.

9. The method for preparing polysilicon of claim wherein the cooling air jet is applied to the piece of polysilicon after or during the application of the first or second predetermined laser beam.

10. The method for preparing polysilicon of claim 1 further comprising:
scribing the piece of polysilicon prior to applying the first or second predetermined laser beam.

11. The method for preparing polysilicon of claim 9 wherein the cooling is applied by cooling jets and the cooling is humidified.

* * * * *